US012010141B1

(12) United States Patent
Mogra et al.

(10) Patent No.: US 12,010,141 B1
(45) Date of Patent: *Jun. 11, 2024

(54) SYSTEM GATEWAY WHILE ACCESSING PROTECTED NON-WEB RESOURCES CONNECTED TO INTERNET

(71) Applicant: Airgap Networks Inc., Santa Clara, CA (US)

(72) Inventors: Lokesh Mogra, Bangalore (IN); Balireddy Ramesh Kumar Reddy, Bangalore (IN); Satish M. Mohan, San Jose, CA (US); Vinay Adavi, Sunnyvale, CA (US); Ritesh R. Agrawal, San Jose, CA (US)

(73) Assignee: Airgap Networks Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/349,848

(22) Filed: Jul. 10, 2023

Related U.S. Application Data

(63) Continuation-in-part of application No. 18/064,177, filed on Dec. 9, 2022, which is a continuation-in-part of application No. 17/521,092, filed on Nov. 8, 2021, which is a continuation of application No. 17/387,615, filed on Jul. 28, 2021, now Pat. No. 11,323,474, and a continuation of application No. 17/357,757, filed on Jun. 24, 2021, now Pat. No. 11,171,985.

(51) Int. Cl.
*H04L 9/40* (2022.01)
*H04L 12/46* (2006.01)

(52) U.S. Cl.
CPC ...... *H04L 63/1466* (2013.01); *H04L 12/4641* (2013.01); *H04L 63/1416* (2013.01)

(58) Field of Classification Search
None
See application file for complete search history.

(56) References Cited

U.S. PATENT DOCUMENTS

| | | | |
|---|---|---|---|
| 6,914,905 | B1 | 7/2005 | Yip |
| 9,602,529 | B2 | 3/2017 | Jones |
| 9,756,061 | B1 | 9/2017 | Roeh |
| 11,093,139 | B1 | 8/2021 | Karr |
| 11,240,242 | B1 * | 2/2022 | Celik .................. H04L 12/4633 |
| 11,818,176 | B1 | 11/2023 | Wu |
| 2009/0217346 | A1 * | 8/2009 | Manring ............... H04L 63/102 726/1 |
| 2018/0124085 | A1 | 5/2018 | Frayman |
| 2020/0404007 | A1 | 12/2020 | Singh |
| 2021/0152595 | A1 | 5/2021 | Hansen et al. |
| 2021/0160275 | A1 | 5/2021 | Anderson |
| 2021/0194894 | A1 | 6/2021 | Anderson |
| 2021/0273953 | A1 | 9/2021 | Fellows |

(Continued)

*Primary Examiner* — Christopher C Harris
(74) *Attorney, Agent, or Firm* — PATENT LAW WORKS LLP

(57) ABSTRACT

A technique to improve security for a VLAN is disclosed. A security appliance is set as the default gateway for intra-LAN communication. Message traffic is analyzed and anomalies are detected relative to normal message traffic that correspond to device health problems that may require service by a field technician. Access to a cloud-based resource may be further protected by enforcing user-based access policies.

15 Claims, 12 Drawing Sheets

(56) References Cited

U.S. PATENT DOCUMENTS

| | | | |
|---|---|---|---|
| 2021/0336933 A1* | 10/2021 | Shah | H04L 67/01 |
| 2022/0029965 A1* | 1/2022 | Chanak | H04L 67/10 |
| 2022/0060498 A1 | 2/2022 | Head, Jr. | |
| 2022/0329585 A1* | 10/2022 | Chhabra | H04L 12/4633 |
| 2022/0393943 A1* | 12/2022 | Pangeni | H04L 67/51 |
| 2022/0408255 A1* | 12/2022 | Howe | H04W 12/062 |
| 2023/0079444 A1* | 3/2023 | Parla | H04L 63/0281 726/11 |
| 2023/0247003 A1 | 8/2023 | Chanak | |
| 2023/0308458 A1 | 9/2023 | Varsanyi | |

\* cited by examiner

1205

```
iptables -nL FORWARD -v
Chain FORWARD (1 references)
 pkts bytes target     prot opt in     out     source               destination
    0     0 DROP       all  --  *      *       0.0.0.0/0            0.0.0.0/0
 match-set gtrh76542test src match-set 1 dst
```

```
ipset list gtrh76542test
# ipset list 1
Name: 1
Type: hash:net
Revision: 6
Header: family inet hashsize 1024 maxelem 65536
Size in memory: 600
References: 1
Number of entries: 1
Members:
10.10.10.10/32
```

1210

Fig. 12

SYSTEM GATEWAY WHILE ACCESSING PROTECTED NON-WEB RESOURCES CONNECTED TO INTERNET

CROSS REFERENCE TO RELATED APPLICATIONS

This application is a continuation-in-part of U.S. patent application Ser. No. 18/064,177, filed Dec. 9, 2022, which is a continuation-in-part of U.S. patent application Ser. No. 17/521,092, filed Nov. 8, 2021, entitled "System and Method to Detect Lateral Movement of Ransomware by Deploying a Security Appliance Over a Shared Network to Implement a Default Gateway with Point-To-Point Links Between Endpoints", which is a continuation of U.S. patent application Ser. No. 17/357,757, filed Jun. 24, 2021, now issued as U.S. Pat. No. 11,171,985 on Nov. 9, 2021, entitled "System and Method to Detect Lateral Movement of Ransomware by Deploying a Security Appliance Over a Shared Network to Implement a Default Gateway with Point-To-Point Links Between Endpoints" and a continuation of U.S. patent application Ser. No. 17/387,615, filed Jul. 28, 2021, now issued as U.S. Pat. No. 11,323,474 on May 3, 2022, entitled "System and Method for Determining Endpoint Compatibility with Subnet Prefix of All-Ones for Lateral Propagation Prevention of Ransomware", which are hereby incorporated by reference in their entirety.

FIELD OF THE INVENTION

The present disclosure generally relates to techniques for ransomware protection. More particularly, the present disclosure is related to providing lateral movement protection from Ransomware in environments, such as shared VLAN environments, while also providing additional support to enforce user-based policies in a cloud gateway to access protected non-web resources.

BACKGROUND

Ransomware is one of the biggest threats facing the security industry today. Ransomware is a form of malware that infects computer systems. Ransomware is becoming an increasing problem in the computer/network security industry. Ransomware infects computer systems and encrypts files. A ransom is demanded in exchange for a decryption key.

Conventional enterprise security solutions have proved to be inadequate in view of the high-profile ransomware cases of large companies, such as the Colonial Pipeline ransomware attack in 2021. The inadequacy of conventional enterprise security solutions is also evidenced by the fact that in 2020 51% of surveyed companies were hit by ransomware attacks.

Firewalls provide inadequate protection against ransomware attacks. In some companies, separate Virtual Local Area Networks (VLANs) are used to segment sections of a company by division as an additional layer of protection. For example, a finance department may have a separate VLAN domain than an engineering department. Or a finance department may have a different VLAN domain than a marketing department. However, this sort of segmentation of VLAN domains by departments doesn't address the problem of lateral movement of Ransomware attacks within a VLAN domain.

One of the reasons for the inadequacy of current enterprise security solutions is the difficulty of protecting against ransomware attacks within a shared VLAN-based network architecture. If a device that is part of a shared VLAN broadcast domain is infected by ransomware or malware, there are very few security controls that can be implemented to prevent lateral propagation of the ransomware within the same VLAN network.

Referring to FIG. 1, a firewall 110 provides some limited protection against external ransomware attacks. However, a VLAN network also has east-west communication between endpoint devices 120 in a shared VLAN domain that is forwarded directly by the network router/switch 140. This east-west Intra-LAN communication is not visible to the network firewall 110 deployed up-stream on the network as shown in FIG. 1.

Current security solutions for lateral propagation protection of ransomware are based on endpoint protection. The drawback of these approaches is that it relies on an agent deployed on each endpoint to detect malicious ransomware processes being launched. Deploying and managing these agents is a challenge for IT organizations, and furthermore they cannot be deployed on IoT devices (such as web cameras, printers, and other devices) and are frequently not supported on older versions of operating systems.

Conventional VLAN network architectures have a potential gap in protection associated with lateral movement of ransomware between endpoint devices. Software applications on endpoint devices provide only limited protection due to a variety of practical problems in managing software apps on endpoint devices and the presence of other IoT devices at endpoint devices, such as web cameras, printers, etc. There is thus a potential for ransomware to enter the VLAN network and laterally propagate to endpoint devices.

SUMMARY

In one implementation, a security appliance is set as the default gateway for intra-LAN communication for two or more endpoint devices. A subnet mask of 255.255.255.255 is used to set the security appliance as a default gateway for a plurality of endpoint devices of the shared VLAN environment. In one implementation, the security appliance is used to detect ransomware. In another implementation, additional security is provided by enforcing user-based policies in a cloud gateway to access projected resources.

It should be understood, however, that this list of features and advantages is not all-inclusive, and many additional features and advantages are contemplated and fall within the scope of the present disclosure. Moreover, it should be understood that the language used in the present disclosure has been principally selected for readability and instructional purposes, and not to limit the scope of the subject matter disclosed herein.

BRIEF DESCRIPTION OF THE DRAWINGS

The present disclosure is illustrated by way of example, and not by way of limitation in the figures of the accompanying drawings in which like reference numerals are used to refer to similar elements.

FIG. 12 illustrates a data structure for implementing user-based policies for a cloud gateway in accordance with an implementation.

DETAILED DESCRIPTION

Figure 1:
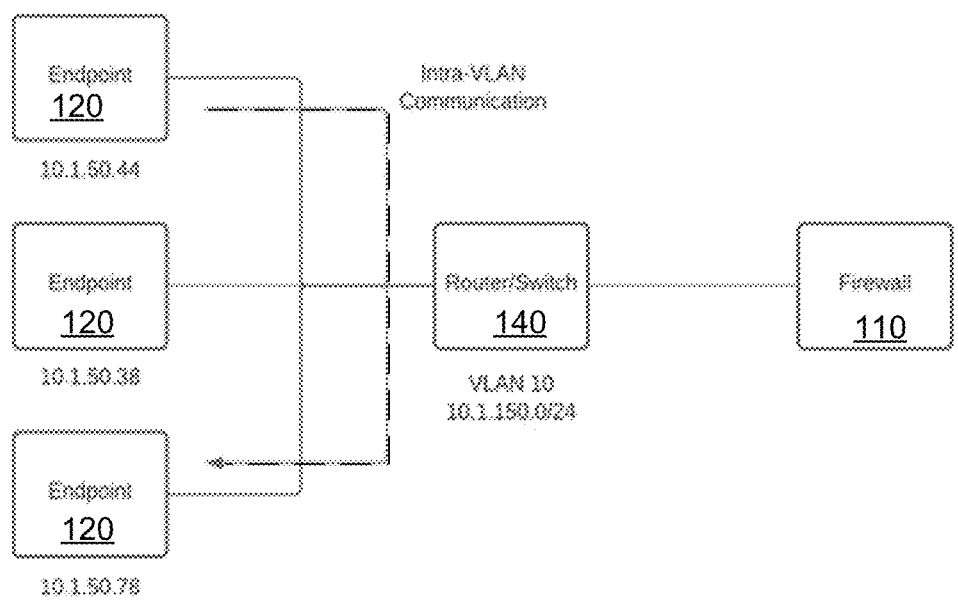
FIG. 1 is a block diagram illustrating Intra-LAN traffic in a conventional VLAN network.
Figure 2:
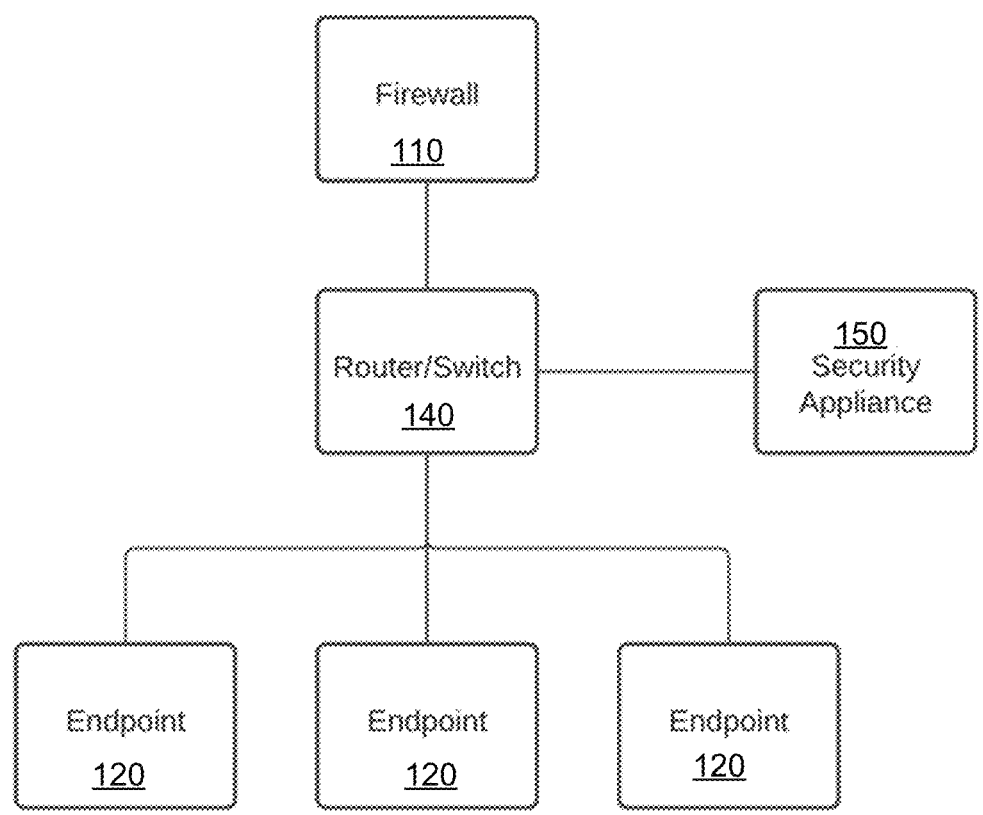
FIG. 2 is a block diagram illustrating a security appliance to provide protection from lateral movement of ransomware in accordance with an implementation.

FIG. 2 is a diagram illustrating a change to a network architecture to prevent lateral propagation of malware and ransomware. The operation of the network router/switch 140 is augmented and enhanced with a security appliance 150. The security appliance could be implemented in a variety of ways, such as using a mixture of hardware and software, firmware, etc. However, in one implementation it is implemented as software that may, for example, be stored on a memory and executed on a computer processor associated with a computing device, such as the router/switch. In one implementation, it may be deployed on an existing port (e.g., an access port or a trunk port) of the VLAN network. As an illustrative example, the security appliance 150 may be implemented as software compatible with a virtual machine (VM) implementation, such as within a hypervisor implementation in VMware®. The security appliance may be deployed on a port that allows the security appliance to monitor and control the flow of message traffic across a network node for a plurality of endpoint devices with an individual VLAN domain or even across multiple VLAN domains. Deploying the security appliance on a trunk port is advantageous because a trunk port is a specific type of port on a network switch that allows data to flow across a network node for multiple virtual local area networks or VLANs. However, the security appliance could alternatively be deployed on an access port.

In one implementation, virtual point to point links between a security appliance 150 and each endpoint 120 are established in a shared VLAN domain that forces all traffic from an endpoint to traverse the security appliance 150. In one implementation, the security appliance is deployed on an access port or a trunk port on an existing router or switch.

In one implementation, the security appliance 150 becomes the default gateway and the Dynamic Host Configuration Protocol (DHCP) Relay responsible for relaying IP address requests to the DHCP function on the network and overwriting the subnet mask in the response to a subnet mask comprised of all-ones—255.255.255.255.

When an individual endpoint 120 requests an IP address, the security appliance 150 sets the security appliance as the default gateway for the endpoint. In one implementation, the security appliance responds with a subnet comprised of all-ones—255.255.255.255—and sets itself as the default gateway for the endpoint. Since the endpoint receives an IP address with a subnet mask of 255.255.255.255, any network communication with other endpoints or internet applications needs to be routed via the default gateway. In other words, a network with a subnet mask of 255.255.255.255 puts each device inside its own subnet, which forces them to communicate with the default gateway before communicating with any other device. The 255.255.255.255 subnet mask may also be referred to by the Classless Inter-Domain Routing (CIDR) prefix /32, which has one IP address. The CIDR number comes from the number of ones in the subnet mask when converted to binary. The 255.255.255.255 subnet mask corresponds to a CIDR prefix of /32.

Since the security appliance 150 sets itself as the default gateway for the network (by virtue of the subnet mask being comprised of all-ones), any East-West communication between different endpoints 120 and communication between an endpoint 120 and other endpoints 120 or applications on different networks will be routed via it. This provides the security appliance with the unique ability to allow only authorized communication and disallow everything else.

Figure 3:
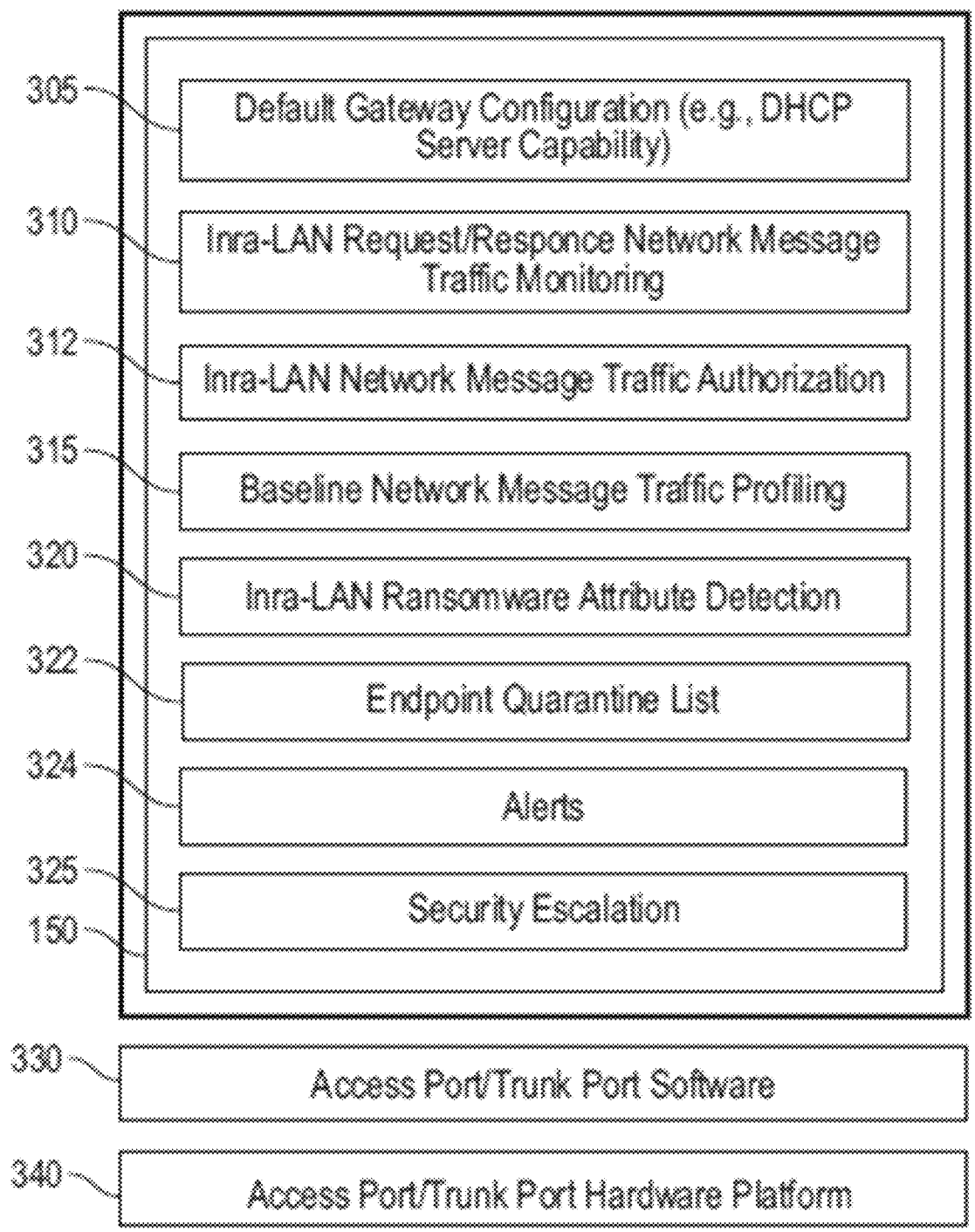
FIG. 3 is a block diagram illustrating components of a security appliance in accordance with an implementation.

FIG. 3 is a high-level diagram illustrating major functional blocks of the security appliance in one implementation. As previously discussed, the security appliance 150 may be deployed in an access port or in a trunk port associated with VLANs for a number of different endpoint devices (e.g., different laptop computers in a VLAN domain). It thus may be implemented as software stored on a computer memory and executable by a processor associated with an access port or a trunk port. For example, it may be implemented as software deployed with the software 330 and hardware 340 environment associated with an access port or a trunk port. In the example of FIG. 3, the security appliance 150 includes a default gateway configuration unit 305 to set the security appliance as a default gateway as described above (e.g., using a subnet mask of 255.255.255.255). An intra-LAN traffic monitoring unit 310 monitors intra-LAN traffic. This can include monitoring both request and response messages in intra-LAN traffic and detecting irregularities in intra-LAN request/response message traffic. An Intra-LAN network message traffic authorization unit 312 allows only authorized communication between the plurality of endpoint devices of the shared VLAN environment. For example, it may block unauthorized communication between endpoints. A baseline traffic profiling unit 315 may be optionally included to develop a baseline profile for typical or normal intra-LAN message traffic patterns between endpoint device 120. For example, the presence of ransomware may generate unusual amounts or types of traffic in comparison to a baseline profile. An Intra-LAN ransomware attribute detection unit 320 determines if one or more intra-LAN messages have computer code indicative of ransomware, such as computer code files to implement file scanning and encryption.

In the example of FIG. 3, the security appliance includes an endpoint quarantine unit 322 to quarantine compromised endpoints. This may include, for example, generating a list of quarantined endpoint devices that are used to block intra-LAN communication for compromised devices (i.e., to stop the lateral movement of ransomware). An alert unit 324 may be included to generate automated alerts, such as generating alerts for an administrator of an attempted ransomware attack. An optional security escalation unit 325 may be included to implement a security escalation protocol to increase security.

It will be understood that while the security appliance 150 may be deployed on an existing VLAN system, in some implementations it may also be incorporated into new VLAN system components, such as being incorporated into an access port or a trunk port.

Figure 4:
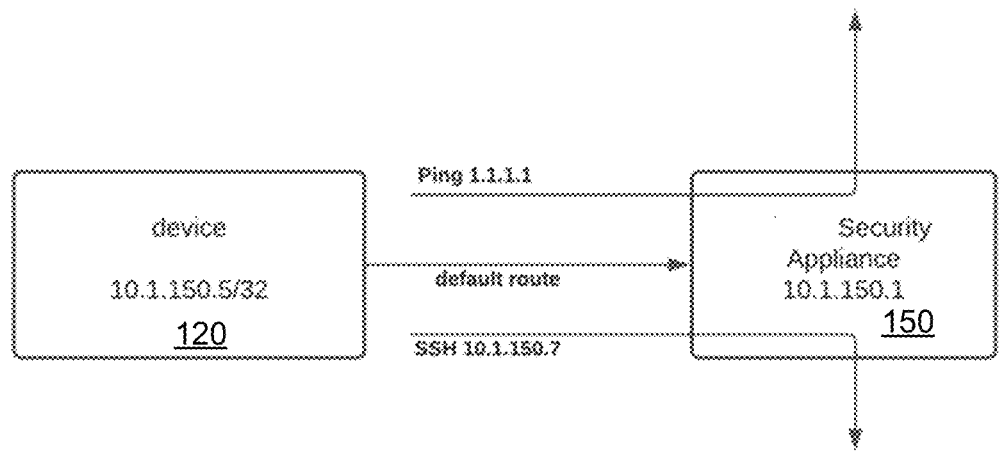
FIG. 4 illustrates the security appliance set as the default gateway in accordance with an implementation.

From the perspective of the endpoint 120, other endpoints and applications appear to be in a different IP network. Hence all outbound packets are sent to the default gateway as shown in FIG. 4. In this example, a /32 subnet is illustrated. However, more generally, a /31 or a /30 subnet may be used. Configuring a /32 subnet mask on endpoints forces all outbound network traffic via the security appliance 150. The security appliance 150 allows only authorized communication between endpoints, thereby significantly reducing the attack surface and lateral propagation by malware and ransomware. Detecting attempts by malicious actors to circumvent the protection provided by the security appliance permits quarantining devices which attempt to do so. Rapid quarantining of compromised endpoint devices stops the lateral propagation of ransomware. This, in turn, reduces the spread and potential damage of a ransomware attack.

Figure 5:
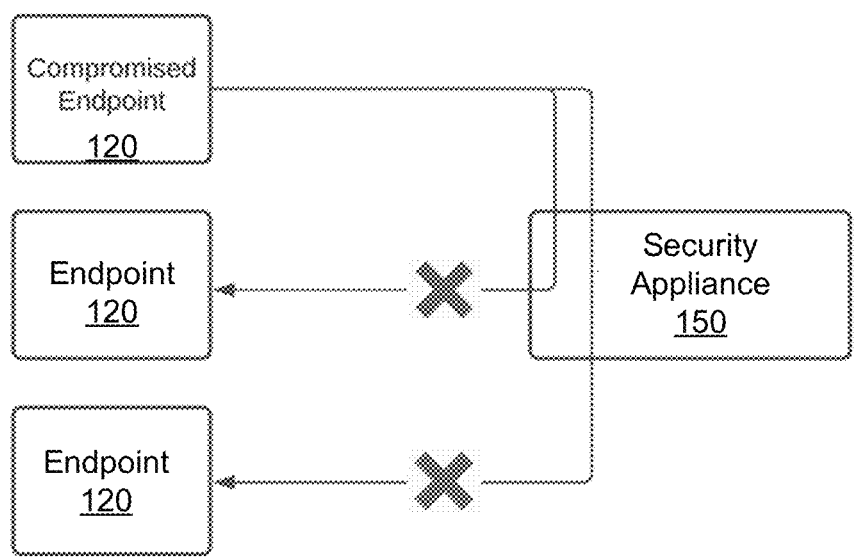
FIG. 5 illustrates how a security appliance may quarantine a compromised endpoint in accordance with an implementation.

FIG. 5 is a high-level block diagram illustrating an example of how lateral propagation of ransomware is prevented in accordance with an implementation. In this example, a compromised endpoint is infected with ransomware. The ransomware may, for example, have entered the compromised endpoint in a variety of different ways, such as through a peripheral IoT device in communication with the compromised endpoint.

Regardless of how the compromised endpoint became infected with ransomware, the security appliance 150 was earlier set as the default gateway. The security appliance 150 monitors message traffic and quarantines suspicious traffic from the compromised endpoint to other endpoints. This may include, for example, detecting message traffic that has attributes associated with ransomware, such as computer code for file scanning or encryption. It may also optionally include, in some implementations, detecting that message traffic that is unusual in comparison to a baseline profile of normal message traffic.

It is possible that ransomware in a compromised endpoint may attempt to directly communicate with another endpoint and bypass the security appliance 150. However, such an attempt to circumvent the security appliance 150 may still be detected and prevented.

Figure 6:
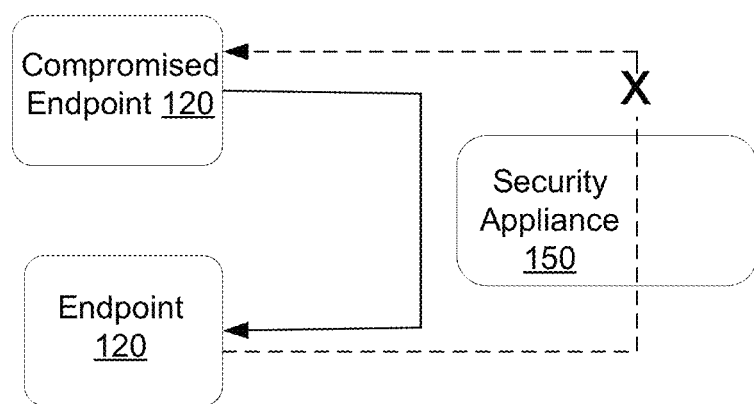
FIG. 6 illustrates how the security appliance may detect compromised endpoints attempting to circumvent the security appliance in accordance with an implementation.

FIG. 6 illustrates an example of how attempts to circumvent protection are detected. A compromised endpoint might, for example, have code in the ransomware that attempts to directly send request messages to another endpoint, bypassing the security appliance 150. However, an uncompromised endpoint will attempt to send its response message to the security appliance 150 as the default gateway. The security appliance 150 determines when it has detected a response from an endpoint directed to another endpoint but for which it has not detected a corresponding request. This discrepancy (a response message but no request message) may be used to identify that a compromised endpoint is attempting to circumvent the protection of the security appliance 150.

Figure 7:
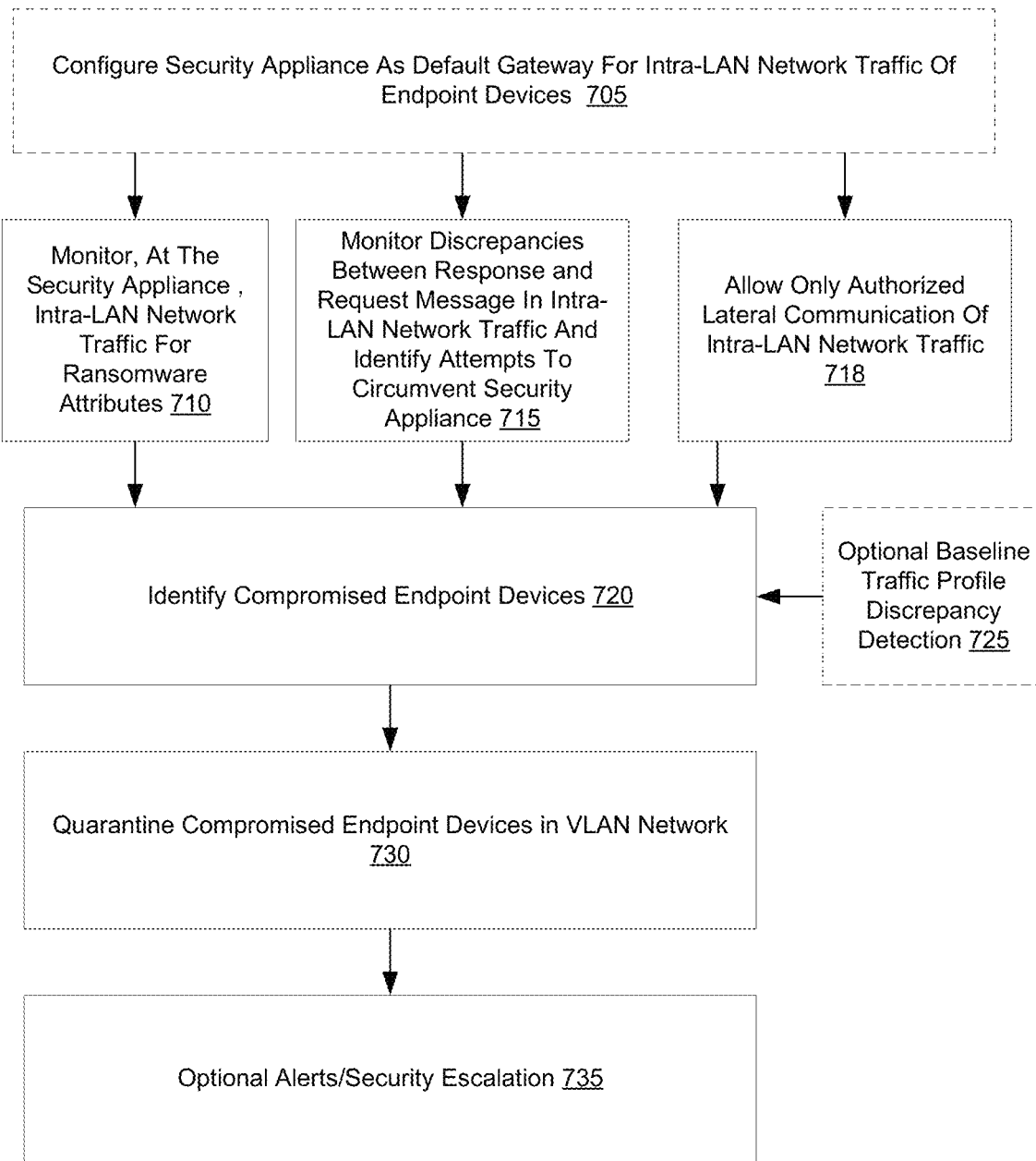
FIG. 7 is a flow chart of an example method for ransomware protection in accordance with an implementation.

FIG. 7 is a flow diagram of a method in accordance with an implementation. In block 705, a security appliance is configured as the default gateway for Intra-LAN network traffic of endpoint device. In block 710, the security appliance monitors intra-LAN network traffic for ransomware attributes. In block 715, the security appliance also monitors the intra-LAN message traffic for discrepancies between response and request messages in intra-LAN network traffic and identify attempts to circumvent the security appliance. In block 718, the method also includes the security appliance allowing only authorized lateral communication of Intra-LAN network traffic. In block 720, compromised endpoint devices are identified based on the outputs of blocks 710 and 715. Optionally, discrepancies with respect to a baseline message traffic profile from block 725 may be considered as an additional factor. In block 730, compromised endpoint devices are quarantined. This may include, for example, placing them on a list of quarantined devices, blocking communication with them, or taking other measures to isolate them. In block 735, optional alerts or security escalation may be performed. Security escalation could, for example, include implementing a security protocol to take further action to mitigate or minimize the risk of further damage from a ransomware attack.

The security appliance 150 restricts communication in a manner that significantly reduces the attack surface available to the ransomware to exploit vulnerabilities in other endpoints and/or applications and propagate laterally. It detects attempts to circumvent the protection provided by the security appliance. If a compromised endpoint attempts to bypass the default gateway and tries to laterally propagate to another device, this attempt would be detected by the security appliance and appropriate action would be taken. This detection is because the uncompromised endpoint would still send the response packets to the compromised endpoint via the security appliance 150 (due to the /32 default route). The security appliance 150 detects the fact that it has seen a response packet to a request sent by the compromised endpoint, and it alerts the operator in this case. Automatic actions may be taken by the security appliance 150, including quarantining the compromised endpoint so that further lateral propagation is impossible.

Cloud Implementation Examples

Some of the problems associated with Ransomware are exacerbated by the recent shift to hybrid work models where a large portion of the workforce is remote. This shift to a hybrid and remote workforce has exposed cracks and weaknesses in traditional perimeter-based security models. Furthermore, there are certain classes of business assets which are high-value/mission-critical and frequently targeted for data-encryption and exfiltration by ransomware attacks. These include ERP systems, finance databases and sensitive corporate data. With a hybrid work model, there has been a shift in executives and corporate officers trying to access these assets remotely. This has resulted in a more pressing need to provide secure access to these mission-critical assets, while at the same time protecting them from ransomware and other malware attacks.

Organizations have attempted to address these security gaps by investing heavily in various Zero Trust Security solutions (these are variously referred as a Zero Trust Network Access (ZTNA) or a Software Defined Perimeter) to enable their hybrid workforce to securely access mission critical business applications. These solutions are based upon the notion of verifying user identity, credentials and endpoint certificates, and security postures before allowing access to private Enterprise applications. When correctly deployed, these solutions can be highly effective in protecting against the lateral propagation of ransomware from compromised endpoints to the private applications. Also, there is a growing need to enforce this protection from the cloud due to users being spread geographically, as cloud-based solutions provide features like seamless scaling, single point enforcement, and easier management.

Zero Trust is a holistic model for securing networks, applications, and data resources with a focus on identity-centric policy model for controlling access. ZTNA refers to giving the right user with the right authentication for the right resource for the right amount of access, enforced through policies.

One of the premises in the ZTNA security model is to apply cloud-based firewalling on user identities. The problem here is to accurately identify users in a /32 network the most efficient and predictable way. One technique used to solve this issue of identifying users in cloud-based firewalling is by doing HTTP header enrichment, in which user-identity is added by an agent running on client machines in the HTTP Headers. These enriched HTTP headers are eventually read by the cloud-based firewall. Another technique of identifying users in cloud-based firewalling is when actual users are behind a virtual private network (VPN) server and then the VPN server is connected to cloud firewall. In this scenario, the actual IP/Identity of user is not easy to obtain especially when the VPN Server acts like a gateway. In that scenario, clients are given dynamic IP addresses, but the VPN server has no easy means to share the user < > dynamicip mapping with the cloud firewall. All these techniques are processing heavy and have limited scope and some techniques, like header enrichment, fails to cover the non-web/non-http scenarios.

User-Management and Policy Enforcement in Cloud Gateway for Users in a /32 Segmented Network In some implementations, individual endpoint devices in the VLAN may use the cloud to access private apps, SAAS, or private data sources. As previously discussed, a security appliance may be used to protect device endpoints on a shared VLAN network from lateral propagation of malware and ransomware. Additional security measures may be provided to enforce user-based policies in a cloud gateway in a manner consistent with a /32 VLAN network.

Figure 8:
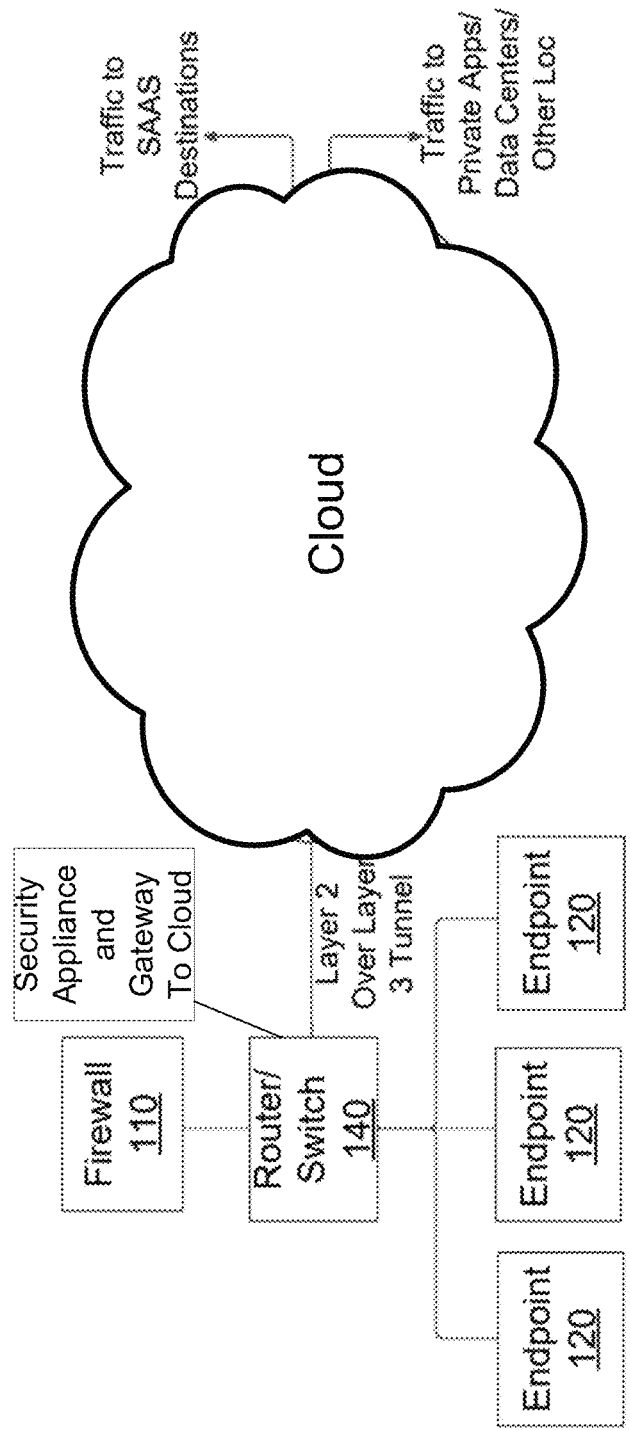
FIG. 8 is a block diagram of a system for using a cloud gateway to access private applications in accordance with an implementation.

Referring to FIG. 8, in one implementation, virtual point to point links (also referred to as swim-lanes) may be established between each endpoint device 120, which is part of the shared VLAN domain in a shared VLAN environment. In this implementation, all traffic from an endpoint device is forced to traverse the security appliance 150 hosted. A cloud gateway is provided to access the cloud, which could be a customer's public/private cloud or a public cloud. In one implementation, an on-prem router/switch 140 is configured to establish a Layer 2 over Layer 3 tunnel to a cloud gateway. An example approach for a Layer 2 over Layer 3 tunnel is MACsec in VXLAN tunnels. MACsec in VXLAN is an end-to-end security protocol for protecting Ethernet frames travelling over IP networks. It provides data security by using high speed encryption of the ethernet frames which are then tunneled over the VXLAN protocol.

When an endpoint device 120 requests an IP address, the security appliance 150 responds back with an IP address and a subnet mask which is comprised of all ones: 255.255.255.255. The security appliance 150 thus sets itself as the default gateway for each endpoint device 120 that requested an IP address. Since each endpoint receives an IP address with a subnet mask of 255.255.255.255, this results in any network communication with other endpoints or internet applications being routed via the default gateway (which is the security appliance in the cloud). From the perspective of an individual endpoint device, other endpoints and applications appear to be in a different IP network. Hence all outbound packets are sent to the default gateway.

One of the major aspects of ZTNA is the need to correctly identify the authenticated user, associated with traffic so that user-based policy can be applied correctly.

In one implementation, an agent (henceforth referred to as the ZTNA Agent) runs on a User Device, which may, for example, a user machine, such as laptop computer or other type of endpoint device user machine in the VLAN network. In one implementation, the ZTNA agent facilitates user registration and sign in through a Cloud Gateway.

Figure 9:
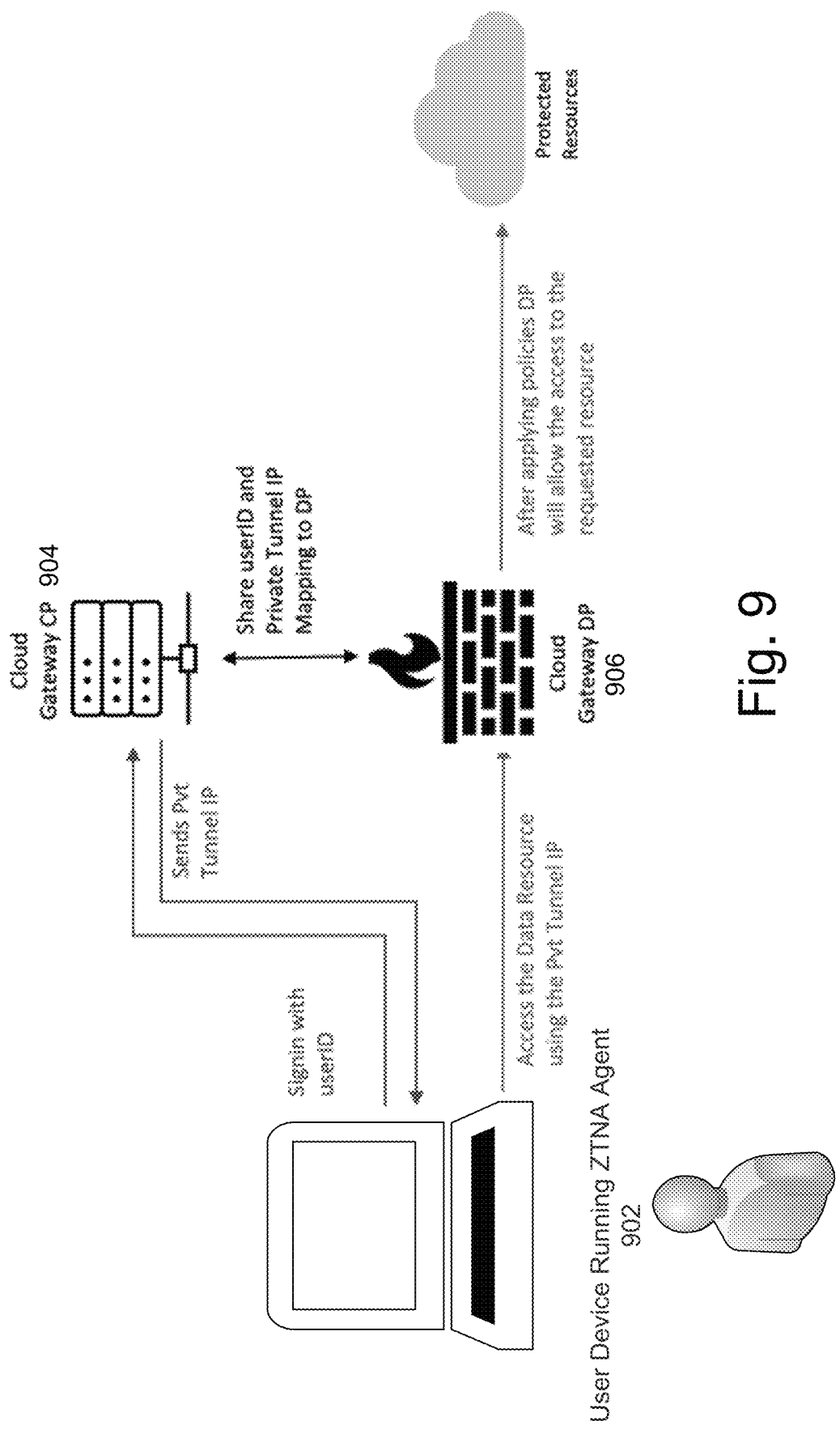
FIG. 9 illustrates an example of a cloud gateway to enforce user-based policies in accordance with an implementation.

Referring to FIG. 9, in one implementation a user machine client device 902 (e.g., a client endpoint device) runs the ZTNA agent. The Cloud Gateway runs a Cloud Gateway control-plane (CP) 904 and Cloud Gateway data-plane (DP) 906. In one implementation, user-management is handled in the Cloud Gateway control-plane 904, while policy enforcement (through a firewall) happens in a Cloud Gateway data-plane 906. The Cloud Gateway Control plane 904 and Cloud Gateway Data plane 906 interact privately with each other to share a user ID and user-identity mapping. The Cloud Gateway data plan 906 applies policies that determine whether it will allow the user device 902 to access a requested data resource using the private tunnel IP.

As illustrated in FIG. 9, a user machine client device 902 running the ZTNA agent signs in with Cloud Gateway control-plane 904 which authenticates the user and allocates a unique Private Tunnel IP that it sends back to the client user device 902. Additionally, the Cloud Gateway control plane 904 and this mapping with the Cloud Gateway data-plane 906 by sharing a user ID and private tunnel IP mapping. After sign-in, the user machine client device 902 connects to Cloud Gateway data-plane with the allocated private tunnel IP to access the data resources using the Private Tunnel IP. The Cloud Gateway Data Plane reverse maps the Private Tunnel IP to the user ID and applies firewall policies accordingly, such as the Cloud Gateway DP applying policies to determine whether to allow access to the requested resource (e.g., a protected resource).

Figure 10:
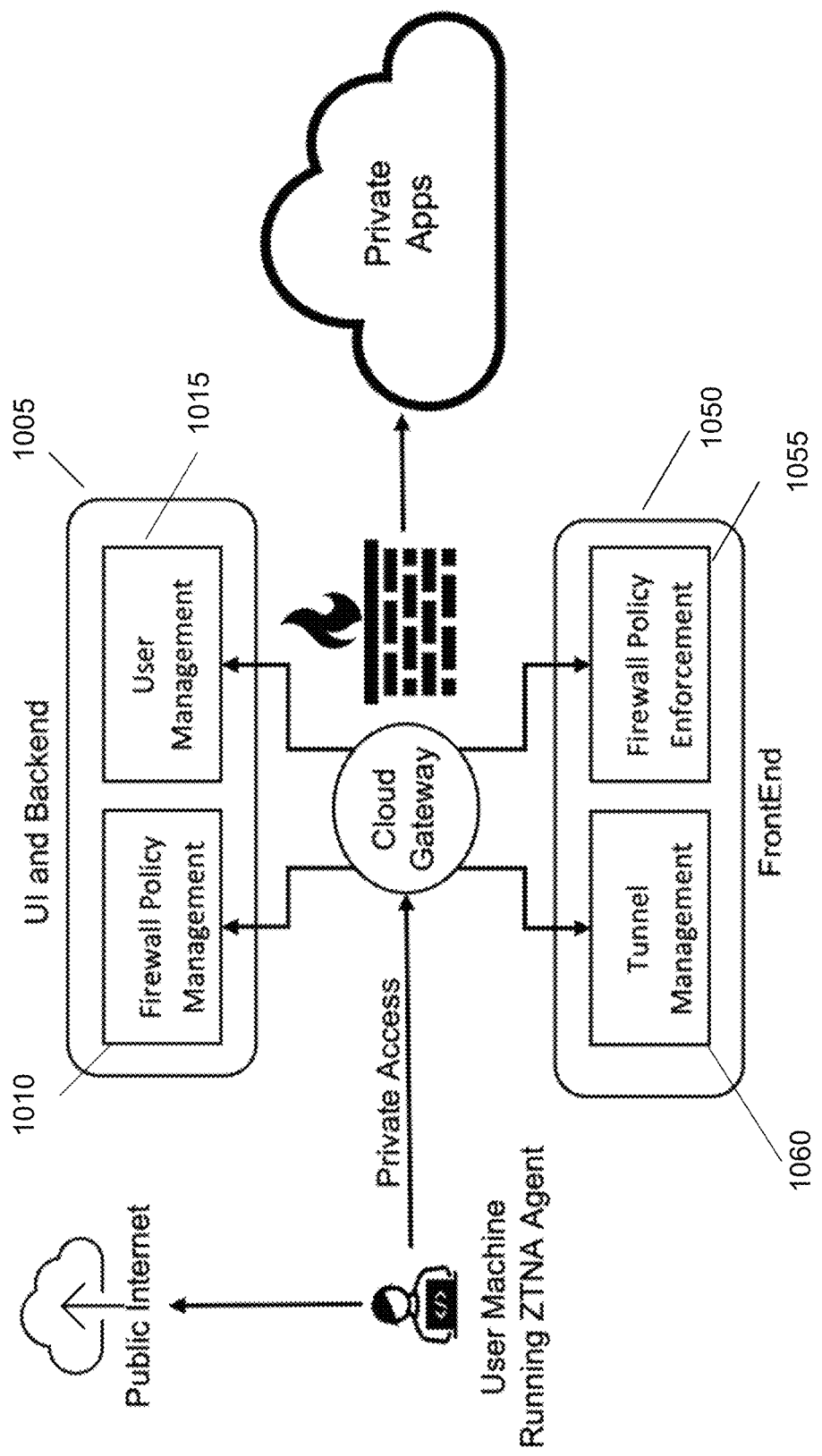
FIG. 10 illustrates an example of a cloud gateway to enforce user-based policies in accordance with an implementation.

FIG. 10 illustrates how the cloud gateway may also be considered as having a UI and backend 1005 as well as a frontend 1050. The UI and backend 1005 have a firewall policy management module 1010 and a user management module 1015. The frontend 1050 has a tunnel management module 1060 and a firewall policy enforcement module 1055. This supports performing various steps, as discussed below in more detail.

An example user management workflow includes the following steps:

1. User Registration, which is one implementation includes:

1a. A New User registers with a tenant name and its email address for downloading a ZTNA Agent. In one implementation, the ZTNA Agent knows the Cloud Gateway Control Plane URL (as part of a ZTNA package), through which the user can sign-in.

1b. The downloaded ZTNA Agent is installed on the User Machine.

1c. On successful registration, a UUID (Universally Unique ID) gets generated for a given user and stored in the Cloud Gateway control-plane.

2. User Sign In

2a. In one implementation, a user signs in using the ZTNA agent, the cloud gateway control plane has a pool of private tunnel IP addresses. The cloud gateway control plane allocates one of the tunnel IP addresses for this user and also creates a mapping of user-identity and this private tunnel IP address. As part of sign-in response, the private tunnel IP address is shared to the client, which is to be used to connect the private tunnel IP. On a successful sign-in, the client device gets a tunnel-config and the cloud gateway dataplane 906 gets the user-IP mapping.

2b. The ZTNA agent then creates a private tunnel with the Cloud Gateway dataplane using the received tunnel-config. The ZTNA Agent creates a private tunnel with cloud gateway 906 data-plane using received tunnel-config.

3. User accesses private resources through the private tunnel.

3a. When the user accesses any of the IPs mentioned in the Private IP Subnets, that traffic is tunneled to the gateway.

3b. The Gateway reverse-maps the private tunnel IP to the user-identity using user-IP mapping and applies the firewall policy. In one implementation, the user-based Firewall Policies are created by the Tenant (e.g., by a Web UI)

4. User Sign-Out

4a. When the user signs out through the ZTNA Agent, the control-plane releases the private tunnel IP and allocates it back to the pool and syncs the same info to its data-plane.

Figure 11:
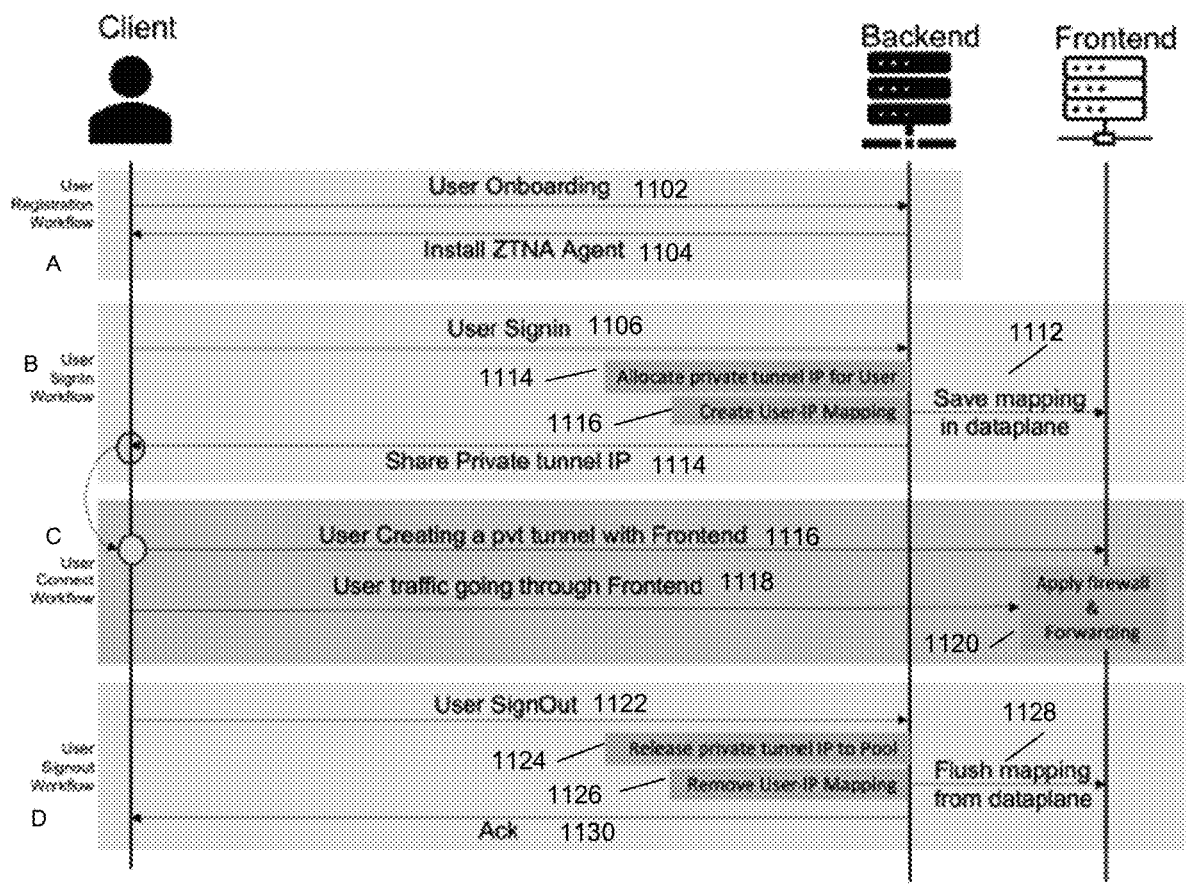
FIG. 11 illustrates an interaction diagram of a method of enforcing user-based policies for a cloud gateway in accordance with an implementation.

FIG. 11 is an interaction diagram showing steps related to user registration workflow "A", user sign-in workflow "B", user connect workflow "C", and user sign-out workflow "D". FIG. 11 in arrow 1102 illustrated user onboarding and installation of the ZTNA agent in arrow 1104. User sign-in 1106 is followed by allocating a private tunnel for a user 1114 and creating a user IP mapping 1116, with in arrow 1112 saving a mapping in the cloud gateway dataplane. In arrow 1114, the private tunnel IP is shared. In arrow 1116 the user creates a private tunnel with the frontend. In arrow 1118, user traffic goes through the frontend, and the firewall is applied and forwarding performed in block 1120. Arrow 1122 illustrates user sign-out. Block 1124 illustrates releasing a private tunnel IP to the pool, and block 1126 illustrates removing user IP mapping. Arrow 1128 illustrated a flushing of the mapping from the dataplane. Arrow 1130 is an ack.

FIG. 12 illustrates an example of the iptables 1205 and IP list 1210 to implement user-based policies.

User-Based Policy Example

In one implementation, iptables-based rules are used to enforce user-based policies in the cloud gateway. The iptables may run on the cloud gateway frontend to apply policies. For example, to apply a policy, the IP is converted to the user ID mentioned in the policy. In the example below, a source and a destination have an allowed action.

| Source | Destination | Action |
| --- | --- | --- |
| Testuser@testorg.com | 15.14.13.0/24 | Allow |

In one implementation, policy application happens using iptables running on the cloud gateway frontend. To apply the policy in the examples above, we need to use the IP address associated to determine the user ID and corresponding policy.

In one implementation, the policy enforcement happens in 2 stages:

Stage1:

When user onboarding happens, a mapping gets generated in the cloud gateway frontend. If this user is available in firewall policies configured by the tenant, an IP set entry is created for that user in Gateway without any IP and iptables rules to apply the policy for this user. e.g.:

ipset create <user_identity>hash:ip iptables -I<chain>-m set -match-set <user_identity>src -match-set 15.14.13.0/24 dst -j<action>

In effect, an iptable rule is created for matching a userid which in some implementations is an ipset with name as "user-identity", which is initially empty. In this ipset, the IP address is set to be associated with the userid.

Stage 2:

When a user does sign in, the gateway allocates a private tunnel ip for the user, and this ip is then added to the ipset that we created above for the userid (in above example) e.g.:

ipset add <user_identity><tunnel_private_ip>

This supports apply user-based firewall policies.

Similarly, when user signs out, the assigned ip address will be removed from the ipset.

Example Sample of how Iptables Rules are Set to Enforce the Policy:

Consider the example where the User-id is as follows:

User-id: testuser@testorg.com (The user-id with which user is registered)

UUID: gtrh76542test (This gets generated for the user by control-plane on user registration, this generated id is important to create as ipsets don't support special character that are allowed in user-id)

Allocated Tunnel IP: 10.10.10.10 (ip allocated by control-plane, when a user signin occurs)

Consider an example policy created by Tenant to drop "testuser" traffic to "15.14.13.0/24"

In this example, for the Control Plane we have: Src: testuser@testorg.com, Dst: 15.14.13.0/24, Action: ACCEPT Data Plane: IPTable Rule to Apply the Policy The iptables -I FORWARD -m set -match-set gtrh76542test src -d 15.14.13.0/24-j DROP Creating ipset (to create match set for above iptable rule): ipset create gtrh76542test hash:ip When user signin, the private tunnel-ip is added to ipset (as created above) for the given user.

o ipset add gtrh76542test 10.10.10.10/32

Te inal IP Table rule for policy enforcement is illustrated in FIG. 12 elements 1205 and 1210 for:

iptables -nL FORWARD -v ipset list gtrh76542test

In this example, when the user sign outs, the corresponding ipset gets flushed: ipset flush gtrh76542test The previous examples described applying user-based policies in a /32 segmented network, where each device is given a private unique IP, dynamically by the gateway in an efficient way, which enables the gateway an easy way to reverse map the private IP back to user identity and thus apply user-based policies on them. This supports policing a /32 network-based on user identities.

Alternate Implementations

Other implementations of one or more of these aspects include corresponding systems, apparatus, and computer programs, configured to perform the actions of the methods, encoded on computer storage devices.

These and other implementations may each optionally include one or more of the following features.

In the above description, for purposes of explanation, numerous specific details were set forth. It will be apparent, however, that the disclosed technologies can be practiced without any given subset of these specific details. In other instances, structures and devices are shown in block diagram form. For example, the disclosed technologies are described in some implementations above with reference to user interfaces and particular hardware.

Reference in the specification to "one embodiment", "some embodiments" or "an embodiment" means that a particular feature, structure, or characteristic described in connection with the embodiment is included in at least some embodiments of the disclosed technologies. The appearances of the phrase "in some embodiments" in various places in the specification are not necessarily all referring to the same embodiment.

Some portions of the detailed descriptions above were presented in terms of processes and symbolic representations of operations on data bits within a computer memory. A process can generally be considered a self-consistent sequence of steps leading to a result. The steps may involve physical manipulations of physical quantities. These quantities take the form of electrical or magnetic signals capable of being stored, transferred, combined, compared, and otherwise manipulated. These signals may be referred to as being in the form of bits, values, elements, symbols, characters, terms, numbers, or the like.

These and similar terms can be associated with the appropriate physical quantities and can be considered labels applied to these quantities. Unless specifically stated otherwise as apparent from the prior discussion, it is appreciated that throughout the description, discussions utilizing terms, for example, "processing" or "computing" or "calculating" or "determining" or "displaying" or the like, may refer to the processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The disclosed technologies may also relate to an apparatus for performing the operations herein. This apparatus may be specially constructed for the required purposes, or it may include a general-purpose computer selectively activated or reconfigured by a computer program stored in the computer.

The disclosed technologies can take the form of an entirely hardware implementation, an entirely software implementation or an implementation containing both software and hardware elements. In some implementations, the technology is implemented in software, which includes, but is not limited to, firmware, resident software, microcode, etc.

Furthermore, the disclosed technologies can take the form of a computer program product accessible from a non-transitory computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A computing system or data processing system suitable for storing and/or executing program code will include at least one processor (e.g., a hardware processor) coupled directly or indirectly to memory elements through a system bus. The memory elements can include local memory employed during actual execution of the program code, bulk storage, and cache memories which provide temporary storage of at least some program code to reduce the number of times code must be retrieved from bulk storage during execution.

Input/output or I/O devices (including, but not limited to, keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

Finally, the processes and displays presented herein may not be inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the disclosed technologies were not described with reference to any particular programming language. It will be appreciated that a variety of programming languages may be used to implement the teachings of the technologies as described herein.

The foregoing description of the implementations of the present techniques and technologies has been presented for the purposes of illustration and description. It is not intended to be exhaustive or to limit the present techniques and technologies to the precise form disclosed. Many modifications and variations are possible in light of the above teaching. It is intended that the scope of the present techniques and technologies be limited not by this detailed description. The present techniques and technologies may be implemented in other specific forms without departing from the spirit or essential characteristics thereof. Likewise, the particular naming and division of the modules, routines, features, attributes, methodologies, and other aspects are not mandatory or significant, and the mechanisms that implement the present techniques and technologies or its features may have different names, divisions, and/or formats. Furthermore, the modules, routines, features, attributes, methodologies, and other aspects of the present technology can be implemented as software, hardware, firmware, or any combination of the three. Also, wherever a component, an example of which is a module, is implemented as software, the component can be implemented as a standalone program, as part of a larger program, as a plurality of separate programs, as a statically or dynamically linked library, as a kernel loadable module, as a device driver, and/or in every and any other way known now or in the future in computer programming. Additionally, the present techniques and technologies are in no way limited to implementation in any specific programming language, or for any specific operating system or environment. Accordingly, the disclosure of the present techniques and technologies is intended to be illustrative, but not limiting.

What is claimed is:

1. A method for ransomware protection in a Virtual Local Area Network (VLAN), comprising:
setting a security appliance as a default gateway using a subnet mask of 255.255.255.255 to set the security appliance as a default gateway for a plurality of client endpoint devices of a shared VLAN environment, monitor intra-VLAN communication between the plurality of endpoint devices of the shared VLAN environment, and detect attributes of intra-LAN messages indicative of lateral propagation of ransomware between endpoint devices via intra-VLAN communication in the shared VLAN environment; and managing a secure private tunnel between a client endpoint device and private applications using a cloud gateway to enforce at least one user-based policy to control access to a private application or private data resource.

2. The method of claim 1, wherein the cloud gateway receives a user ID during a sign-in step, allocate a private tunnel IP address, and provide the private tunnel IP address to an agent on the client endpoint device, and use the user ID and a private tunnel IP mapping to identify policies for limiting or permitting the client endpoint device to access a request resource.

3. The method of claim 2, wherein the at least one user-based policy is selectable.

4. A computer-implemented method of ransomware protection in a Virtual Local Area Network (VLAN), comprising:

setting a security appliance as a default gateway for a plurality of endpoint devices of the shared VLAN environment by using a subnet mask of 255.255.255.255, monitoring, by the security appliance, intra-VLAN communication between the plurality of endpoint devices of a shared VLAN environment, and detecting, by the security appliance, lateral propagation of ransomware between endpoint devices via intra-VLAN communication in the shared VLAN environment;

managing a secure tunnel between an endpoint device and a protected resource using a cloud-based gateway to implement at least one user-based access policy for a user to use the secure tunnel to access a private application or a private data resource.

5. The computer-implemented method of claim 4, wherein the cloud gateway is configured to receive a user ID during a sign-in step, allocate a private tunnel IP address, and provide the tunnel IP address to an agent on the endpoint device, and use the user ID and a private tunnel IP mapping to identify policies for limiting or permitting the client endpoint device to access a request resource via the cloud.

6. The computer-implemented method of claim 5, wherein the at least one user-based policy is selectable.

7. The computer-implemented method of claim 4, wherein the cloud gateway comprises a backend and a front end:

the backend installing an agent in the endpoint device, receiving a user ID during a sign-in, allocating a private tunnel IP for a user, creating a user IP mapping, and sharing a private tunnel IP address with the endpoint device; and the frontend receiving the user IP mapping and applying a user-based policy for user traffic of the private IP tunnel going through the frontend to allow or limit access to a data resource the endpoint device attempts to connect with using the private tunnel IP.

8. The computer-implemented method of claim 7, wherein the policy applies a firewall to the private tunnel IP to block access to a private application.

9. The computer-implemented method of claim 7, wherein the policy is executed to forward an access request to a private application.

10. The computer-implemented method of claim 7, wherein user-based access policies are implemented for determining access to private applications.

11. The computer-implemented method of claim 7, wherein the policy applies a firewall to the private tunnel IP to block access to a private application.

12. An apparatus for ransomware protection in a Virtual Local Area Network (VLAN), comprising:

computer program instructions, stored on a non-transitory computer readable medium, which when executed on a process implements a method comprising:

setting a security appliance as a default gateway for a plurality of endpoint devices of the shared VLAN environment by using a subnet mask of 255.255.255.255, monitoring, by the security appliance, intra-VLAN communication between the plurality of endpoint devices of the shared VLAN environment, and detecting, by the security appliance, lateral propagation of ransomware between endpoint devices via intra-VLAN communication in the shared VLAN environment; and managing a secure tunnel between an endpoint device and a protected resource using a cloud-based gateway to implement at least one user-based access policy for a user to use the secure tunnel to access a private application or a private data resource.

13. The system of claim 12, wherein the cloud gateway is configured to receive a user ID during a sign-in step, allocate a private tunnel IP address, and provide the tunnel IP address to an agent on the endpoint deice, and use the user ID and a private tunnel IP mapping to identify policies for limiting or permitting the endpoint device to access a request resource via the cloud.

14. The system of claim 13, wherein the at least one user-based policy is selectable.

15. The system of claim 12, wherein the cloud gateway comprises a backend and a front end, and the method implemented by the computer program instructions includes:

the backend installing an agent in the endpoint device, receiving a user ID during a sign-in, allocating a private tunnel IP for a user, creating a user IP mapping, and sharing a private tunnel IP address with the endpoint device; and the frontend receiving the user IP mapping and applying a user-based policy for user traffic of the private IP tunnel going through the frontend to allow or limit access to a data resource the endpoint device attempts to connect with using the private tunnel IP.

* * * * *